United States Patent [19]

Renner et al.

[11] Patent Number: 4,666,997
[45] Date of Patent: May 19, 1987

[54] HEAT-CURABLE MIXTURE CONTAINING SUBSTITUTED BICYCLO[2.2.1]HEPT-5-ENE-2,3-DICARBOXIMIDE AND POLYMALEIMIDE, AND THE USE THEREOF

[75] Inventors: Alfred Renner, Muntelier; Sameer H. Eldin, Fribourg, both of Switzerland

[73] Assignee: Ciba-Geigy Corporation, Ardsley, N.Y.

[21] Appl. No.: 773,724

[22] Filed: Sep. 9, 1985

[30] Foreign Application Priority Data

Sep. 14, 1984 [CH] Switzerland .................. 4389/84

[51] Int. Cl.⁴ .............. C08G 20/00; C08G 73/10; C08F 222/40
[52] U.S. Cl. .................. 525/502; 526/262; 528/159; 528/163; 528/170; 528/321; 528/322
[58] Field of Search ........... 526/262; 528/322, 321, 528/159, 170, 163; 525/502

[56] References Cited

U.S. PATENT DOCUMENTS

| | | | |
|---|---|---|---|
| 3,380,964 | 4/1968 | Grundschober et al. | 260/47 |
| 3,562,223 | 2/1971 | Bargalu et al. | 260/78 |
| 3,658,764 | 4/1972 | Bargalu et al. | 260/78 |
| 4,038,251 | 7/1977 | Forgo et al. | 260/47 |
| 4,515,962 | 5/1985 | Renner | 548/435 |

FOREIGN PATENT DOCUMENTS 1443067 7/1976 United Kingdom .

*Primary Examiner*—Harold D. Anderson
*Attorney, Agent, or Firm*—Harry Falber

[57] ABSTRACT

Heat-curable mixtures comprising
(a) 10–90% by weight of at least one compound of formula I

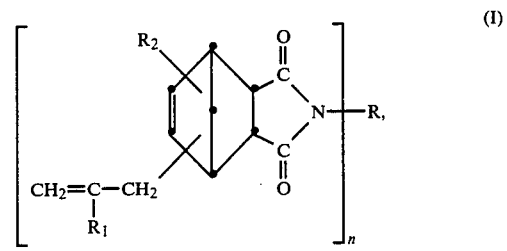

(b) 90–10% by weight of at least one compound of formula II

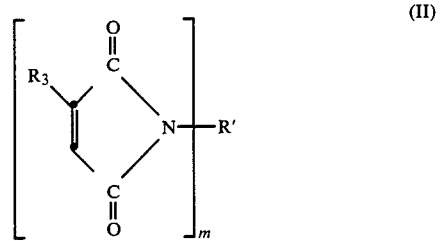

and, based on the sum of (a)+(b),
(c) 0–30% by weight of at least one compound which is able to react with component (b),
in which formulae above n, m, R, R', R₁, R₂ and R₃ are as defined in claim 1, are suitable for the preparation of moulded articles such as prepregs and composites, coatings and bonds.

13 Claims, No Drawings

HEAT-CURABLE MIXTURE CONTAINING SUBSTITUTED BICYCLO[2.2.1]HEPT-5-ENE-2,3-DICARBOXIMIDE AND POLYMALEIMIDE, AND THE USE THEREOF

The present invention relates to heat-curable mixtures containing substituted bicyclo[2.2.1]hept-5-ene-2,3-dicarboximides and polymaleimides and to the use thereof.

European patent application 105024 A1 discloses allyl- or methallyl-substituted bicyclo[2.2.1]hept-5-ene-2,3-dicarboximides and the use thereof for the manufacture of polymers by heating the imides to temperatures ranging from 180° to 300° C. It is also known that polymaleimides can be converted into cross-linked products with or without the addition of crosslinking agents such as diamines or diols (q.v. for example U.S. Pat. Nos. 3,562,223, 3,658,764, 3,380,964 and 4,038,251).

The present invention relates to novel heat-curable mixtures comprising (a) 10–90% by weight of at least one compound of formula I

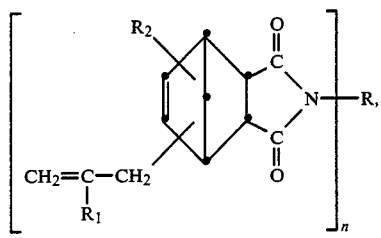

(b) 90–10% by weight of at least one compound of formula II

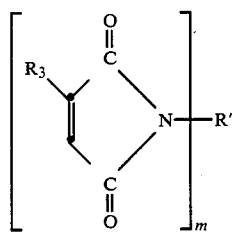

and, based on the sum of (a)+(b), (c) 0–30% by weight of at least one compound which is able to react with component (b), in which formulae (I) and (II) above n is 1 or 2 and m is 2 or 3, R if n is 1, is a hydrogen atom, $C_1$–$C_{12}$alkyl, $C_3$–$C_6$alkenyl, $C_5$–$C_8$cycloalkyl, $C_6$–$C_{10}$aryl or benzyl, or, if n is 2, is —$C_pH_{2p}$—, wherein p is 2 to 20, in particular —$(CH_2)_p$—, wherein p is 2 to 12, or is $C_6$–$C_{10}$arylene or a group of the formula III

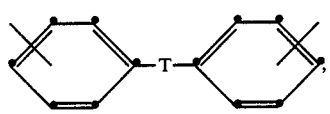

wherein T is methylene, isopropylidene, —CO—, —O—, —S— or —$SO_2$—,

R' is an organic radical of valency m which contains 2 to 30 carbon atoms, and $R_1$, $R_2$ and $R_3$ are each independently a hydrogen atom or a methyl group.

Each of $R_1$ and $R_2$ is preferably a hydrogen atom.

R may be a straight chain or branched chain $C_1$–$C_{12}$alkyl group such as methyl, ethyl, isopropyl, n-butyl, isopentyl, n-hexyl, 2-ethylhexyl, n-decyl and n-dodecyl, but is preferably $C_1$–$C_8$alkyl. R as $C_3$–$C_6$alkenyl may also be straight chain or branched and is for example allyl, methallyl, 2-butenyl and 3-hexenyl, with allyl being preferred. A cycloalkyl group R may be a cyclopentyl, cyclohexyl, cycloheptyl or cyclooctyl group, with cyclohexyl being preferred.

An aryl group R may be unsubstituted phenyl or a phenyl group which is substituted by one or two methyl groups, e.g. tolyl or xylyl or is naphthyl. Preferably R is a phenyl group. R as a —$C_pH_{2p}$— group may be a straight chain or branched radical such as ethylene, propylene, trimethylene, tetramethylene, hexamethylene, octamethylene and dodecamethylene. Preferably R is a —$(CH_2)_p$— group in which m is 2 to 12. A group of formula III represented by R is preferably attached in the 4,4'-position to the N-atoms.

R as a $C_6$–$C_{10}$arylene group may be a m-phenylene, p-phenylene, 1,3-naphthylene, 1,4-naphthylene, 1,5-naphthylene or 2,6-naphthylene group.

If R is a group of the formula III, T is preferably the methylene group, —O— or —$SO_2$—.

Preferred compounds of formula I are those wherein each of $R_1$ and $R_2$ is a hydrogen atom and R, if n is 1, is hydrogen, $C_1$–$C_8$alkyl, allyl, cyclohexyl, phenyl or benzyl; or, if n is 2, R is —$(CH_2)_p$—, in which p is 2 to 12, m- or p-phenylene, or is a group of formula III, wherein T is the methylene group, —O— or —$SO_2$—.

Particularly preferred compounds of formula I are those wherein each of $R_1$ and $R_2$ is a hydrogen atom and R, if n is 1, is allyl or, if n is 2, is —$(CH_2)_6$— or

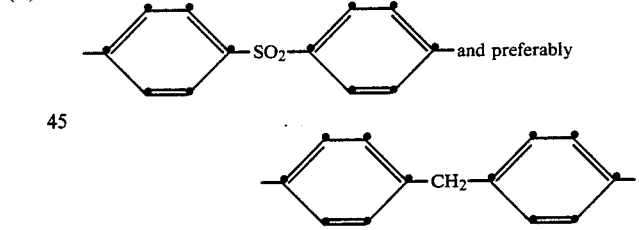

Most preferably, the mixtures of this invention contain, as component (a): N-allyl-allylbicyclo[2.2.1]hept-5-ene-2,3-dicarboximide, bis[4-(allylbicyclo)[2.2.1]hept-5-ene-2,3-dicarboximidophenyl)]methane or N,N'-hexamethylene-bis(allylbicyclo[2.2.1]hept-5-ene-2,3-dicarboximide), or a mixture of these compounds.

Examples of specific compounds of formula I are:

N-methyl-allylbicyclo[2.2.1]hept-5-ene-2,3-dicarboximide,

N-allyl-allylbicyclo[2.2.1]hept-5-ene-2,3-dicarboximide,

N-(2-ethylhexyl)-allylbicyclo[2.2.1]hept-5-ene-2,3-dicarboximide,

N-cyclohexyl-allylbicyclo[2.2.1]hept-5-ene-2,3-dicarboximide,

N-phenyl-allylbicyclo[2.2.1]hept-5-ene-2,3-dicarboximide,

N-benzyl-allylbicyclo[2.2.1]hept-5-ene-2,3-dicarboximide,

N,N'-ethylene-bis(allylbicyclo[2.2.1]hept-5-ene-2,3-dicarboximide),
N,N'-hexamethylene-bis(allylbicyclo[2.2.1]hept-5-ene-2,3-dicarboximide),
N,N'-dodecamethylene-bis(allylbicyclo[2.2.1]hept-5-ene-2,3-dicarboximide),
bis[4-(allylbicyclo[2.2.1]hept-5-ene-2,3-dicarboximidophenyl)]methane,
bis[4-(methallylbicyclo[2.2.1]hept-5-ene-2,3-dicarboximidophenyl)]methane,
N,N'-p-phenylene-bis(allylbicyclo[2.2.1]hept-5-ene-2,3-dicarboximide),
bis[4-(allylbicyclo[2.2.1]hept-5-ene-2,3-dicarboximidophenyl)]ether,
bis[4-(allylbicyclo[2.2.1]hept-5-ene-2,3-dicarboximidophenyl)]sulfone,
N-allyl-allylmethylbicyclo[2.2.1]hept-5-ene-2,3-dicarboximide,
N-(2-ethylhexyl)-allylmethylbicyclo[2.2.1]hept-5-ene-2,3-dicarboximide,
N-phenyl-allylmethylbicyclo[2.2.1]hept-5-ene-2,3-dicarboximide,
N,N'-hexamethylene-bis(allylmethylbicyclo[2.2.1]hept-5-ene-2,3-dicarboximide),
bis[4-(allylmethylbicyclo[2.2.1]hept-5-ene-2,3-dicarboximidophenyl)]methane, and
bis[4-(methallylmethylbicyclo[2.2.1]hept-5-ene-2,3-dicarboximidophenyl)]sulfone.

The imides of formula I can be prepared in a manner known per se, for example by the process described in European patent application No. 105 024 A1, by reacting an anhydride of formula IV

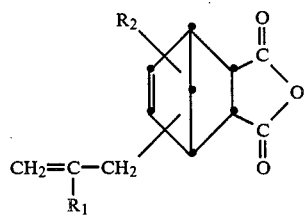
(IV)

with a compound of formula V (H$_2$N)$_n$—R  (V)

wherein R, R$_1$, R$_2$ and n are as defined for formula I, at elevated temperature, while distilling off the water of reaction. Where the compound of formula V is ammonia or a low boiling monoamine, it is advisable to use an excess of this reactant. Diamines will conveniently be employed in stoichiometric proportion. The reaction can be carried out without a solvent or in the presence of an inert solvent suitable for removing the water as an azeotrope (entrainer). The reaction temperature can be in the range from 100° to 250° C. It is preferred to prepare the imides of formula I in the melt under a pressure of not more than 4500 Pa in the temperature range from 130° to 220° C., preferably from 180° to 220° C.

Examples of suitable organic radicals R' when m is 2 are: Wherein p is 2 to 20, preferably —(CH$_2$)—C$_p$H$_{2p}$)—, wherein p is 2 to 12, —CH$_2$CH$_2$SCH$_2$CH$_2$—, C$_6$-C$_{10}$arylene, xylylene, cyclopentylene, cyclohexylene, 1,4-bis(methylene)cyclohexylene, the radical of bicyclohexylmethane, or radicals of the formulae VI or VII

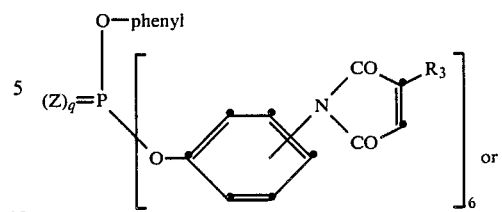
(VI)

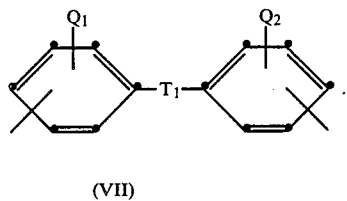
(VII)

If m is 3, then R' is e.g. a radical of formula VIII

(VIII)

In the above formulae VI to VIII, T$_1$ is methylene, isopropylidene, —CO—, —S—, —SO$_2$—, —P=O(Q$_3$)—, —NQ$_3$— (Q$_3$=C$_1$-C$_4$alkyl), —N=N—, —CONH—, —COO—, —NQ$_3$—CO—X—CO—NQ$_3$—, —O—CO—X—CO—O—,

q is 0 or 1,
Z is O or S,
Q$_1$ and Q$_2$ are each independently of the other a halogen atom, preferably chlorine or bromine, or are methyl or ethyl and, most preferably, a hydrogen atom,
X is a direct bond, —C$_t$H$_{2t}$—, in which t is 1 to 12, C$_6$-C$_{10}$arylene, xylylene, cyclopentylene or cyclohexylene, and R$_3$ is as defined above.

Typical examples of maleimides of formula II which the mixtures of this invention may contain are:
N,N'-ethylene-bismaleimide,
N,N'-hexamethylene bismaleimide,
N,N'-m-phenylene bismaleimide,
N,N'-phenylene bismaleimide,
N,N'-4,4'-diphenylmethane-bismaleimide,
N,N'-4,4'-3,3'-dichlorodiphenyl-methane-bismaleimide,
N,N'-4,4'-diphenyl ether-bismaleimide,
N,N'-4,4'-diphenylsulfone-bismaleimide,
N,N'-m-xylylene-bismaleimide,
N,N'-p-xylylene-bismaleimide,
N,N'-4,4'-2,2-diphenylpropane-bismaleimide, the N,N'-bismaleimide of 4,4'-diaminotriphenylphosphate, the N,N'-bismaleimide of 4,4'-diaminotriphenylphosphite, the N,N'-bismaleimide of 4,4'-diaminotriphenylthiophosphate, the N,N',N''-trismaleimide of tris(4-aminophenyl)phosphate, the N,N',N''-trismaleimide of tris(4-aminophenyl)phosphite, the N,N',N''-trimaleimide of tris(4-aminophenyl)phosphite, and the N,N',N''-trismaleimide of tris(4-aminophenyl)thiophosphate.

Preferred compounds of formula II are those wherein m is 2, $R_3$ is a hydrogen atom and R' is —$(CH_2)_p$—, in which p is 2 to 12, or is m- or p-phenylene, m- or p-xylylene, 1,4-cyclohexylene, 1,4-bis(methylene)cyclohexylene, the radical of 4,4'-biscyclohexylmethane and, in particular, a radical of formula VII which is attached to the nitrogen atoms in the 4,4'-position, wherein each of $Q_1$ and $Q_2$ is a hydrogen atom and $T_1$ is O, $CH_2$ or $SO_2$. The most preferred compound of formula II is N,N',4,4'-diphenylmethane-bismaleimide.

As component (c) it is possible to use any known compounds which are able to react with the compounds of formula II. Particularly suitable components (c) are diamines and diols of formula IX $$HQ—R''—QH \quad (IX)$$

wherein Q is O or NH and R'' is a divalent radical of 2 to 30 carbon atoms, as well as phenol and cresol novolaks, or mixtures of such compounds.

R'' as divalent organic radical can have the same meaning as R'. Preferably R'' in formula IX is —$C_pH_{2p}$—, in which p is 2 to 20, in particular —$(CH_2)_p$—, in which p is 2 to 12, or is $C_6$-$C_{10}$arylene, preferably m- or p-phenylene, xylylene, cyclopentylene, cyclohexylene, 1,4-bis(methylene)cyclohexylene, the radical of bicyclohexylmethane or a radical of the formula III. Most preferably, R'' is a radical of formula III which is bonded in the 4,4'-position.

Examples of groups R' or R'' as —$C_pH_{2p}$— or of arylene groups R', R'' and X are mentioned under R.

A further class of preferred components (c) comprises alkenyl-substituted phenols and polyols. Typical examples are: compounds of formula X

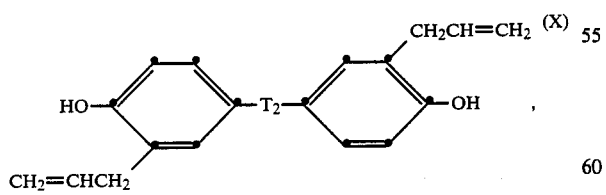

wherein $T_2$ is a direct bond, methylene, isopropylidene, —O—, —S—, —SO— or —$SO_2$—. Examples of such compounds are: o,o'-diallyl-bisphenol A, bis(4-hydroxy-3-allyl)biphenyl, bis(4-hydroxy-3-allylphenyl)methane and 2,2-bis(4-hydroxy-3-allylphenyl)propane; propenyl-substituted phenols of formula XI

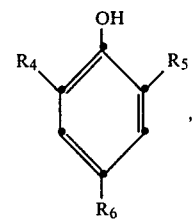

wherein $R_4$, $R_5$ and $R_6$ are each independently a hydrogen atom or an allyl or propenyl group, with the proviso that at least one of $R_4$ to $R_6$ is a propenyl group; compounds of formula XII

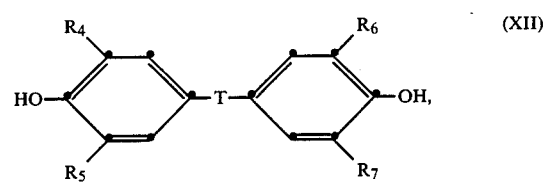

wherein $R_4$, $R_5$, $R_6$ and $R_7$ are each independently a hydrogen atom or an allyl or propenyl group, with the proviso that at least one of $R_4$ to $R_7$ is a propenyl group, and T is as defined for formula III; and compounds of formula XIII

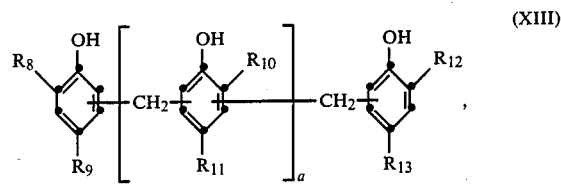

wherein $R_8$, $R_9$, $R_{10}$, $R_{11}$, $R_{12}$ and $R_{13}$ are each independently a hydrogen atom, $C_1$-$C_4$alkyl, allyl or propenyl, with the proviso that at least one of $R_8$ to $R_{13}$ is a propenyl group, and a is a value from 0 to 10. Compounds of formula XII are preferred in which each of $R_4$ and $R_6$ is a propenyl group and each of $R_5$ and $R_7$ is a hydrogen atom and T is methylene, isopropylidene or —O—.

It is also possible to use mixtures of isomers of propenyl- and allyl-substituted mono- or polyhydric phenols. Among the mixtures of isomers it is preferred to use mixtures of propenyl- and allyl-substituted phenols of formula XII, preferably those which are obtained by partial isomerisation of allyl-substituted phenols of formula XIIa

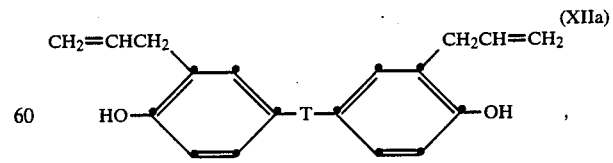

wherein T is methylene, isopropylidene or O. Such alkenyl-substituted phenols and polyols are disclosed e.g. in U.S. Pat. Nos. 4,100,140 and 4,371,719.

Further suitable components (c) are azomethines of formula XIV or XV

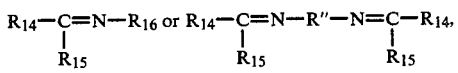

(XIV)      (XV)

wherein $R_{14}$ is a hydrogen atom or a monovalent hydrocarbon radical and $R_{15}$ and $R_{16}$ may have the same meanings as $R_{14}$ but are not hydrogen, or $R_{14}$ and $R_{15}$ together with the carbon atom to which they are attached form a cycloaliphatic ring system and $R''$ is as defined for formula IX. Some compounds are described e.g. in British patent specification No. 1 443 067.

Preferred azomethines are compounds of formula XIV and, in particular, of formula XV, in which $R_{14}$ is hydrogen, $R_{15}$ and $R_{16}$ are phenyl and $R''$ is —(CH$_2$)$_r$— in which r is 2 to 8, m- or p-phenylene or a radical of formula III. Representative examples of such azomethines are:
1,6-benzylidene-hexamethylenediamine,
N,N'-benzylidene-4,4'-diaminodiphenylmethane,
N,N'-benzylidene-p-phenylenediamines and benzalaniline.

Also suitable are dihydrazides of formula XVI

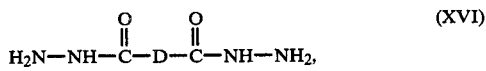

wherein D is a direct bond or a divalent organic radical, in particular the radical of an aliphatic, cycloaliphatic or aromatic dicarboxylic acid. Representative examples of compounds of formula XVI are: oxalic dihydrazide, malonic dihydrazide, succinic dihydrazide, glutaric dihydrazide, adipic dihydrazide, pimelic dihydrazide, suberic dihydrazide, sebacic dihydrazide, cyclohexanedicarboxylic dihydrazide, terephthalic dihydrazide, isophthalic dihydrazide, 2,6- and 2,7-naphthalenedicarboxylic dihydrazide, and mixtures of such dihydrazides.

Further suitable hydrazides are hydrazides of amino acids of formula XVII

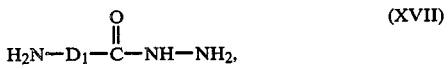

wherein $D_1$ is a divalent organic radical, for example the hydrazides of the following amino acids: aminoacetic acid, alanine, leucine, isoleucine, phenylaniline, valine, β-alanine, γ-aminobutyric acid, α-aminobutyric acid, ε-aminocapronic acid, aminovaleric acid, m-aminobenzoic acid and anthranilic acid; or hydrazides of amino acids of formula XVIII

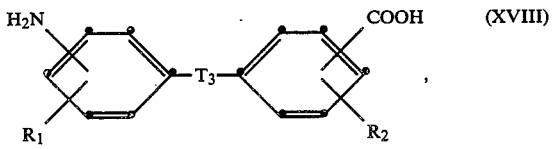

wherein $T_3$ is a direct bond, —O—, —S—, —SO$_2$— or —CH$_2$—, and each of $R_1$ and $R_2$ independently of the other is a hydrogen atom or a methyl group.

Finally, aminocrotonic acid derivatives of the kind disclosed in U.S. Pat. Nos. 4,089,845 and 4,247,672 may also be used as component (c).

Preferably the mixtures of this invention contain, as component (c), phenol or cresol novolaks, compounds of the formula IXa

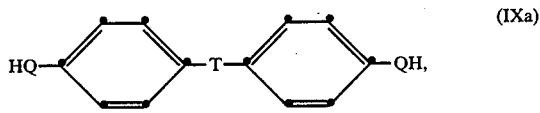

wherein Q and T are as defined for formula IX or III and T is preferably methylene or isopropylidene, or compounds of the formula X, wherein $T_2$ is isopropylidene, and mixtures of the above preferred compounds. The compounds of formulae II to V and IX to XVII are known or can be prepared by methods which are known per se.

Components (a) are preferably employed in an amount of 20–50% by weight and component (b) is preferably employed in an amount of 50–80% by weight. The amount of component (c) is conveniently 0–25% by weight and, preferably, 10–25% by weight, based on the sum of (a)+(b).

The mixtures of this invention can be prepared in a manner known per se by grinding and blending or by melting the components. Conventional auxiliaries such as fillers, plasticisers, pigments, dyes, mould release agents and flame retardants can also be added to these mixtures.

The curing or processing of the mixtures can be carried out in an inert organic solvent, but preferably from the melt and, if appropriate, in the presence of a curing catalyst. Examples of inert organic solvents are: N,N-dimethylformamide, N,N-dimethylacetamide, N-methylpyrrolidone, toluene, xylenes, methyl ethyl ketone, and ethylene glycol monoalkyl or dialkyl ethers containing 1 to 4 carbon atoms in the alkyl moiety or moieties. Depending on the nature of the component (c) employed and on the intended utility, suitable curing catalysts may be for example organic peroxides such as di-tert-butyl peroxide, dicumyl peroxide or tert-butyl perbenzoate, or basic catalysts, in particular primary, secondary and tertiary amines, for example diethylamine, tributylamine, triethylamine, benzylamine, N,N,N',N'-tetramethyl-4,4'-diaminodiphenylmethane, N,N-diisobutylaminoacetonitrile, N,N-dibutylaminoacetonitrile and heterocyclic bases such as quinoline, N-methylpyrrolidine and imidazole. Especially when using phenols or polyols as component (c), it is advisable to add a basic catalyst of the indicated kind. Curing is normally carried out in the temperature range from 150° to 350° C., preferably from 180° to 300° C.

The mixtures of this invention are low melting solid to liquid resins and are distinguished by high reactivity and good mechanical properties of the products cured with them, for example good flexural and shear strength or interlaminary shear strength. Products obtained with them have high glass transition temperatures and are substantially non-brittle. The mixtures of this invention can also be readily applied from the melt, especially without the addition of non-volatile solvents, for example for impregnating glass fibre, carbon fibre or aramide fibre fabrics, such as fabrics made from poly(1,4-phenyleneteraphthalamides) known under the registered trademark Kevlar ®.

The mixtures of this invention have a wide range of utilities, for example as laminating or electrical engineering resins, as high temperature adhesives, or for making coatings or mouldings such as prepregs and composites. Accordingly, the invention also relates to the use of the mixtures of the invention for making moulded articles, coatings or bonds by curing and to the products so obtained.

The following examples illustrate the invention in more detail.

EXAMPLE 1

51.53 g of bis[4-(allylbicyclo[2.2.1]hept-5-ene-2,3-dicarboximidophenyl)]methane (N,N',4,4'-diphenylmethane-bis(allylnadic)imide, prepared in accordance with Example 11 of European patent application No. 105.024 A1, m.p. 80° C.) are melted and 48.47 g of N,N',4,4'-diphenylmethane-bismaleimide are dissolved in this melt. The imide mixture has a glass transition temperature of 72° C. In differential thermoanalysis (system TA 2000 of Mettler AG, Greifensee, Switzerland) the mixture has a reaction beginning $T_A$ at 130° C., a reaction peak $T_{max}$ at 230° C. and a reaction fading $T_E$ at 320° C. The integral heat of reaction $\Delta H$ of the curing is 244 kJ/kg. The mixture is processed to sheets measuring 120×120×4 mm, which are cured for 12 hours at 250° C. A product having the following properties is obtained:

| | |
|---|---|
| flexural strength according to DIN 53452 | 92.0 N/mm² |
| edge elongation according to ISO 178 | 2.9% |
| impact strength according to DIN 53453 | 7.3 kJ/m² |
| water absorption after 4 days at room temperature (20°-25° C.) | 2.34% |
| water absorption after 1 hour at 100° C. | 0.89% |
| glass transition temperature (determined with a Mettler TA 2000 differential thermoanalyser) | 312° C. |

EXAMPLE 2

24.68 g of bis[4-(allylbicyclo[2.2.1]hept-5-ene-2,3-diocarboximidophenyl)]methane] are melted. Then 63.62 g of N,N',4,4'-diphenylmethane-bismaleimide and 13.70 g of 4,4'-diaminodiphenylmethane are added. The mixture has a glass transition temperature of 85° C. The following values are determined by differential thermoanalysis: $T_A=110°$ C., $T_{max}=215°$ C., $T_E=290°$ C., integral heat of reaction=163 kJ/kg. The mixture is processed to sheets measuring 120×120×4 mm, which are cured for 12 hours at 250° C. The following properties of the cured sheets are determined (by the same test norms as indicated in Example 1):

| | |
|---|---|
| flexural strength | 132.7 N/mm² |
| edge elongation | 4.54% |
| impact strength | 19.56 kJ/m² |
| water absorption after 4 days at room temperature | 1.63% |
| water absorption after 1 hour at 100° C. | 0.76% |
| glass transition temperature | 351.5° C. |

EXAMPLES 3-8

Further mixtures of components (a), (b) and optionally (c) are prepared by the methods described in Examples 1 and 2 and processed to sheets measuring 120×120×4 mm. The properties of the mixtures and of the cured products are determined as indicated in Example 1. The results are reported in Table I.

TABLE I

| Example | 3 | 4 | 5 | 6 |
|---|---|---|---|---|
| Components a, b, c (g) | | | | |
| a N—allyl-allylbicyclo[2.2.1]hept-5-ene-2,3-dicarboximide[4] | 27.1 | 12.2 | — | — |
| bis[4-(allylbicyclo[2.2.1]-hept-5-ene-2,3-dicarboximidophenyl)]methane | — | — | 45.28 | 23.65 |
| b N,N',4,4'-diphenylmethanebismaleimid | 59.6 | 71.9 | 42.59 | 59.37 |
| c 4,4'-diaminodiphenylmethane | 13.3 | 15.9 | — | — |
| 2,2-bis(4-hydroxy-3-allylphenyl)propane | — | — | 12.17 | 16.98 |
| Dynamic viscosity $\eta_{80}$ (Pa · s) | 1.97 | — | — | — |
| $T_G$ (°C.) | — | 70 | — | — |
| $T_A$ (°C.) | 140 | 140 | 140/290[3] | 140 |
| $T_{max}$ (°C.) | 235 | 240 | 235/310 | 235 |
| $T_E$ (°C.) | 330 | 330 | 290/355 | 330 |
| $\Delta H$ (kJ/kg) | 260 | 330 | —/199 | 260 |
| Properties of the cured products after curing for 12 hours at 250° C.: | | | | |
| flexural strength (N/mm²) | 113.2 | 149.2 | 140.2 | 156.4 |
| edge elongation (%) | 3.30 | 5.0 | 4.91 | 5.72 |
| impact strength (kJ/m²) | 7.95 | 13.7 | 13.64 | 16.96 |
| water absorption after 4 h/room temperature (%) | 1.40 | 1.32 | 1.41 | 1.49 |
| water absorption 1 h/100° C. (%) | 0.55 | 0.51 | 0.64 | 0.70 |
| $T_G$ (°C.)[2] | 343 | 330 | 341 | 347.5 |

| Example | 7 | 8 |
|---|---|---|
| Components a, b, c (g) | | |
| a N—allyl-allylbicyclo[2.2.1]hept-5-ene-2,3-dicarboximide | 48.6 | 48.6 |
| b N,N',4,4'-diphenylmethane-bismaleimide | 71.6 | 71.6 |
| c 2,2-bis(4-hydroxyphenyl)propane (bisphenol A) | 28.8 | — |
| bis(4-hydroxyphenyl)methane (bisphenol F) | — | 20.0 |
| Catalyst: N,N,N',N'—tetramethyl-4,4'-diaminodiphenylmethane (g) | 0.149 | 1.40 |
| $\eta_{80}$ (Pa · s) | 2.12 | 0.77 |
| $T_A$ (°C.) | 130 | 155/285[3] |
| $T_{max}$ (°C.) | 242 | 235/320 |
| $T_E$ (°C.) | 300 | 285/360 |
| $\Delta H$ (kJ/kg) | 276 | 282/15 |
| Properties of the cured products after curing for 1 h/220° C., 6 h/250° C.: | | |
| flexural strength (N/mm²) | 121.8 | 113.8 |
| edge elongation (%) | 3.31 | 2.74 |
| impact strength (kJ/m²) | 10.0 | 7.85 |
| shear strength on anticorodal according to DIN 53283 (N/mm²) | 51.98 | 35.30 |
| water absorption after 4 h/room temperature (%) | 0.39 | 0.88 |
| water absorption after 1 h/100° C. (%) | 0.59 | 0.80 |
| $T_G$ (°C.)[2] | 346 | 343 |

[1]glass transition temperature of the starting mixture
[2]glass transition temperature of the cured product
[3]first and second peak
[4]prepared according to Example 3 of European patent application 105024 A1

EXAMPLES 9-12

Further mixtures of the components (a), (b) and (c) indicated in Table II are prepared by the method described in Example 2 and their glass transition temperatures are determined. The results are reported in Table II. Then N,N-dimethylformamide is charged to a reactor, heated to 60° C., and the mixtures are added in portions, with stirring, in such amounts that the prepregs thereby obtained have a resin content of 41-42 percent by weight. The requisite amounts of the mixtures are determined beforehand by means of preliminary experiments. Stirring is continued for about 1 hour at 60°–70° C., after which time clear, yellowish brown solutions are obtained in all cases.

PREPARATION OF THE PREPREGS

Carbon fibre webs of Type G814 NT (available from Brochier S.A.), measuring 245×16 cm, are drawn through the above described impregnating solutions and hung up for 10 minutes to drip. They are then mounted on a drying frame and dried for 8 minutes at 160° C. in a circulating air oven. The dried carbon fibre webs are cut into sections measuring 13.5×14.5 cm. All the prepregs have a resin content of 41–42% by weight according to gravimetric determination.

LAMINATE PREPARATION 11 prepreg sections (13.5×14.5 cm) are each covered on both sides with copper foil and wrapped in a poly(diphenyloxide-pyromellitimide) sheet (Kapton ®, Du Pont). The prepregs are then put into a press which has been pre-heated to 180° C. After a contact time of 2 minutes, a pressure of 907 kg is applied for 2 minutes, thereby ensuring a sufficient flow of the resin mixture. After 7 minutes the pressure is increased to 3628 kg over 3 minutes and this pressure is maintained for 1 hour at 180° C. The laminates so obtained are cooled and removed from the press at 100°–120° C. The laminates have a very good surface without visible gaps and are subsequently cured as follows in a circulating air oven: 3 h/200° C., 3 h/225° C. and 12 h/250° C.

The interlaminary shear strength of the laminates is determined at 23° C. in accordance with ASTM D 2344. The results are reported in the following Table II.

TABLE II

| Example | 9 | 10 | 11 | 12 |
|---|---|---|---|---|
| Components a, b, c (g) | | | | |
| a  bis[4-(allylbicyclo[2.2.1]hept-5-ene-2,3-dicarboximido-phenyl)]methane | 136.0 | 136.92 | — | — |
|    N,N'—hexamethylene-bis-(allylbicyclo[2.2.1]hept-5-ene-2,3-dicarboximide)[1] | — | — | — | 305.36 |
|    N—allyl-allyl-bicyclo[2.2.1]hept-5-ene-2,3-dicarboximide | — | — | 68.04 | — |
| b  N,N',4,4'-diphenylmethane-bismaleimide | 341.6 | 343.68 | 400.96 | 223.72 |
| c  4,4'-diaminodiphenylmethane | 76.0 | — | 88.76 | 49.48 |
|    2,2-bis(4-hydroxy-3-allyl-phenyl)propane | — | 98.28 | — | — |
| glass transition temperature of the starting mixture in °C. | 90 | 43 | 54 | 74 |
| interlaminary shear strength of the laminates N/mm$^2$ - average value[2] | 40.1 | 34.8 | 50.4 | 57.6 |

[1] prepared according to Example 9 of European patent application 105024 Al
[2] average value of 6 measurements.

What is claimed is:
1. A heat-curable mixture comprising
(a) 10–90% by weight of at least one compound of formula I

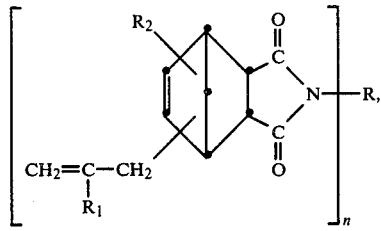

(b) 90–10% by weight of at least one compound of formula II

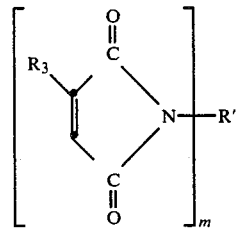

and, based on the sum of (a)+(b),
(c) 0–30% by weight of at least one compound which is able to react with component (b),
in which formulae (I) and (II) above
n is 1 or 2 and m is 2 or 3,
R when n is 1, is a hydrogen atom, $C_1$–$C_{12}$alkyl, $C_3$–$C_6$alkenyl, $C_5$–$C_8$cycloalkyl, $C_6$–$C_{10}$aryl or benzyl, or, when n is 2, is —$C_pH_{2p}$—, wherein p is 2 to 20, or is $C_6$–$C_{10}$arylene or a group of the formula III

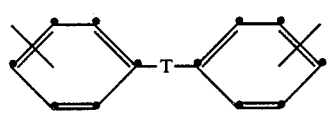

wherein T is methylene, isopropylidene, —CO—, —O—, —S— or —$SO_2$—,
R' is an organic radical of valency m which contains 2 to 30 carbon atoms, and
$R_1$, $R_2$ and $R_3$ are each independently a hydrogen atom or a methyl group.
2. A mixture according to claim 1, wherein each of $R_1$ and $R_2$ is a hydrogen atom.
3. A mixture according to claim 1, wherein each of $R_1$ and $R_2$ is a hydrogen atom and R, when n is 1, is hydrogen, $C_1$–$C_8$alkyl, allyl, cyclohexyl, phenyl or benzyl; or, when n is 2, R is —$(CH_2)_p$—, in which p is 2 to 12, m- or p-phenylene, or is a group of formula III, wherein T is the methylene group, —O— or —$SO$—$_2$.
4. A mixture according to claim 1, wherein each of $R_1$ and $R_2$ is a hydrogen atom and R, when n is 1, is allyl or, when n is 2, is —$(CH_2)_6$—,

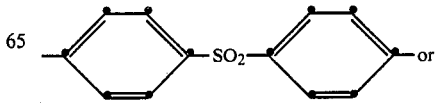

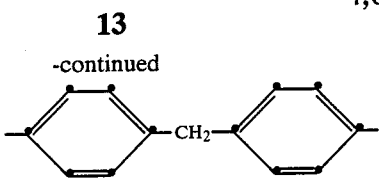

5. A mixture according to claim 1, which contains, as component (a): N-allyl-allylbicyclo[2.2.1]hept-5-ene-2,3-dicarboximide, bis[4(allylbicyclo)[2.2.1]hept-5-ene-2,3-dicarboximidophenyl)]methane or N,N'-hexamethylene-bis(allylbicyclo[2.2.1]hept-5-ene-2,3-dicarboximide), or a mixture thereof.

6. A mixture according to claim 1, wherein m is 2, $R_3$ is a hydrogen atom and R' is —$(CH_2)_p$—, in which p is 2 to 12, m- or p-phenylene, m- or p-xylylene, 1,4-cyclohexylene, 1,4-bis(methylene)cyclohexylene, the radical of 4,4'-bicyclohexylmethane or is a radical of the formula VIIa

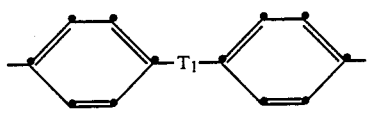

wherein $T_1$ is —O—, —$CH_2$— or —$SO_2$—.

7. A mixture according to claim 1, which contains N,N',4,4'-diphenylmethane-bismaleimide as component (b).

8. A mixture according to claim 1, which contains, as component (c), a diamine of the formula IX $$HQ-R''-QH \quad (IX),$$

wherein Q is —NH— and R'' is a divalent organic radical of 2 to 30 carbon atoms.

9. A mixture according to claim 1, which contains component (a) in an amount of 20 to 50% by weight, component (b) in an amount of 50–80% by weight, and component (c) in an amount of 0–25% by weight, based on the sum of (a)+(b).

10. A process for the preparation of a moulded article, coating or bond by curing a curable mixture as claimed in claim 1.

11. A mixture according to claim 1, which contains, as component (c), a diol of the formula $$HO-R''-OH$$

wherein R'' is a divalent organic radical of 2 to 30 carbon atoms; a phenol novolak; a cresol novolak; or a mixture of such compounds.

12. A mixture according to claim 8, which contains, as component (c), a compound of the formula IXa

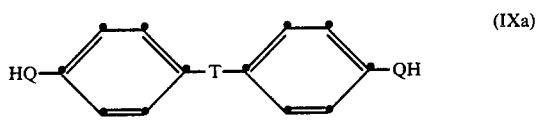

wherein Q is —NH— and T is methylene or isopropylidene.

13. A mixture according to claim 11, which contains, a component (c), a phenol novolak, a cresol novolak, a compound of the formula IXa

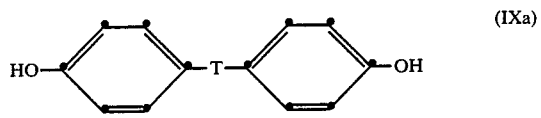

wherein T is methylene or isopropylidene, or a mixture of said compounds.

* * * * *